United States Patent
Hu

(10) Patent No.: US 8,213,499 B2
(45) Date of Patent: Jul. 3, 2012

(54) METHOD AND APPARATUS FOR CONTEXT ADDRESS GENERATION FOR MOTION VECTORS AND COEFFICIENTS

(75) Inventor: Yendo Hu, La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 1372 days.

(21) Appl. No.: 11/696,566

(22) Filed: Apr. 4, 2007

(65) Prior Publication Data

US 2008/0276078 A1 Nov. 6, 2008

(51) Int. Cl.
*H04N 7/12* (2006.01)
(52) U.S. Cl. ......... 375/240.01; 375/240.25; 375/240.26; 375/240.23
(58) Field of Classification Search .................. 716/101, 716/132; 713/500
See application file for complete search history.

(56) References Cited

U.S. PATENT DOCUMENTS

| | | | |
|---|---|---|---|
| 5,111,415 A | 5/1992 | Shackleford | |
| 5,751,233 A | 5/1998 | Tateno et al. | |
| 5,798,953 A | 8/1998 | Lozano | |
| 5,951,677 A | 9/1999 | Wolf et al. | |
| 6,058,213 A | 5/2000 | Cho | |
| 6,349,379 B2 | 2/2002 | Gibson et al. | |
| 6,970,114 B2 | 11/2005 | Lovell | |
| 7,286,066 B1 | 10/2007 | Ho et al. | |
| 7,397,402 B1 | 7/2008 | Hu | |
| 2003/0142874 A1 | 7/2003 | Schwartz | |
| 2003/0189571 A1 | 10/2003 | MacInnis et al. | |
| 2005/0012759 A1 | 1/2005 | Valmiki et al. | |
| 2005/0066150 A1* | 3/2005 | Mehta | 712/205 |
| 2005/0259736 A1 | 11/2005 | Payson | |
| 2006/0114985 A1* | 6/2006 | Linzer | 375/240 |
| 2006/0159181 A1 | 7/2006 | Park et al. | |
| 2006/0256856 A1 | 11/2006 | Koul et al. | |
| 2006/0256869 A1 | 11/2006 | Chin | |
| 2008/0111722 A1 | 5/2008 | Reznik | |
| 2008/0122662 A1 | 5/2008 | Hu | |
| 2008/0137726 A1* | 6/2008 | Chatterjee et al. | 375/240.01 |
| 2008/0219349 A1 | 9/2008 | Huang et al. | |
| 2008/0240234 A1* | 10/2008 | Hung et al. | 375/240.02 |
| 2008/0247459 A1 | 10/2008 | Hu | |
| 2008/0276078 A1 | 11/2008 | Hu | |
| 2010/0007534 A1* | 1/2010 | Girardeau, Jr. | 341/107 |
| 2011/0019737 A1 | 1/2011 | Yang et al. | |
| 2011/0200308 A1* | 8/2011 | Tu et al. | 386/356 |
| 2011/0249754 A1* | 10/2011 | Karczewicz et al. | 375/240.18 |
| 2011/0280306 A1* | 11/2011 | Zheludkov et al. | 375/240.13 |

OTHER PUBLICATIONS

"A macroblock-level analysis on the dynamic behaviour of an H.264 decoder"; authors: Florian H. Seitner, Ralf M. Schreier, Member, IEEE; Michael Bleyer, Margrit Gelautz, Member, IEEE; year 2007.*
PCT Search Report & Written Opinion for PCT/US07/83412; May 15, 2008.

(Continued)

*Primary Examiner* — David Y Jung
(74) *Attorney, Agent, or Firm* — Stewart M. Weiner

(57) ABSTRACT

A method for high/low usage is provided. The method receives a macroblock data structure and a syntax element at a digital signal processing engine. Further, the method classifies the syntax element as high use or low use. In addition, the method sends the syntax element from the digital signal processing engine to a logic unit, distinct from the digital processing engine, for binarization if the syntax element is high use.

13 Claims, 16 Drawing Sheets

OTHER PUBLICATIONS

R. Osorio, et al, "Arithmetic Coding Architecture for H.264/AVC CABAC Compression System," in Proceedings of 2004 Euromicro Symposium on Digital Systems Design (DSD 2004), Architectures, Methods and Tools, Aug. 31-Sep. 3, 2004, Rennes, France, IEEE Computer Society 2004, pp. 62-69.

G. Sullivan, et al, ISO/IEC 14496-10 Advanced Video Coding 3rd Edition, ISO/IEC JTC 1/SC29/WG11, N6540, Redmond (USA), Jul. 2004.

Schmookler, Martin S., et al, "Leading Zero Anticipation and Detection—A Comparison of Methods", IEEE Proceedings, 15th Symposium on Computer Arithmetic (ARITH15) 2001.

ITU-T Recommendation H.264 (Mar. 2005), "Advanced video coding for generic audio/visual services", International Telecommunication Union, Mar. 2005.

Moffat, et al, "Arithmetic Coding Revisited", ACM Transactions on Information Systems, vol. 16, No. 3, Jul. 1998, pp. 256-294.

* cited by examiner

METHOD AND APPARATUS FOR CONTEXT ADDRESS GENERATION FOR MOTION VECTORS AND COEFFICIENTS

BACKGROUND

1. Field

This disclosure generally relates to the field of video data processing. More particularly, the disclosure relates to Context Adaptive Binary Arithmetic Coding ("CABAC") for digital video encoders.

2. General Background

Video signals generally include data corresponding to one or more video frames. Each video frame is composed of an array of picture elements, which are called pixels. A typical color video frame having a standard resolution may be composed of over several hundreds of thousands of pixels, which are arranged in arrays of blocks. Each pixel is characterized by pixel data indicative of a hue (predominant color), saturation (color intensity), and luminance (color brightness). The hue and saturation characteristics may be referred to as the chrominance. Accordingly, the pixel data includes chrominance and luminance. Therefore, the pixel data may be represented by groups of four luminance pixel blocks and two chrominance pixel blocks. These groups are called macroblocks ("MBs"). As a video frame generally includes many pixels, the video frame also includes a large number of MBs. Thus, digital signals representing a sequence of video frame data, which usually include many video frames, have a large number of bits. However, the available storage space and bandwidth for transmitting these digital signals is limited. Therefore, compression processes are used to more efficiently transmit or store video data.

Compression of digital video signals for transmission or for storage has become widely utilized in a variety of contexts. For example, multimedia environments for video conferencing, video games, Internet image transmissions, digital TV, and the like utilize compression. Coding and decoding are accomplished with coding processors. Examples of such coding processors include general computers, special hardware, multimedia boards, or other suitable processing devices. Further, the coding processors may utilize one of a variety of coding techniques, such as variable length coding ("VLC"), fixed coding, Huffman coding, blocks of symbols coding, and arithmetic coding. An example of arithmetic coding is Context Adaptive Binary Arithmetic Coding ("CABAC").

CABAC techniques are capable of losslessly compressing syntax elements in a video stream utilizing the probabilities of syntax elements in a given context. The CABAC process will take in syntax elements representing all elements within a macroblock. Further, the CABAC process constructs a compress bit sequence by building out the following structure: the sequential set of fields for the macroblock based on the chosen macroblock configuration, the specific syntax element type and value for each of the fields within this field sequence, and the context address for each of the syntax elements. The CABAC process will then perform binarization of the syntax elements, update the context weights, arithmetically encode the binarizations of syntax elements ("bins"), and subsequently pack the bits into bytes through the syntax element processing component.

The components of the CABAC process include: the CABAC weight initialization mode selection module, the macroblock syntax sequence generator, the binarization engine, the context address generator, the context weight update engine, the arithmetic coder, the bit packetizer, and the Network Abstraction Layer ("NAL") header generator. The CABAC engine within a video encoder may accomplish two goals within the encoding process: (1) to carry out compressed data resource prediction for mode decision purposes; and (2) to losslessly compress the data for signal output delivery. The compressed data resource prediction task predicts the amount of bits required given a set of specific encoding modes for a given macroblock. Potential mode decision implementations may have up to eight modes to select from. The computational demand on the CABAC engine to support the mode decision task is significant. As the processing throughput may be quite large, current implementations involve high costs and extensive resources.

The proposed invention takes advantage of a clear classification of high usage input data and low usage input data. Following this notion, it supports a processing architecture that is optimized for this case.

SUMMARY

In one aspect of the disclosure, a method for high/low usage is provided. The method receives a macroblock data structure and a syntax element at a digital signal processing engine. Further, the method classifies the syntax element as high use or low use. In addition, the method sends the syntax element from the digital signal processing engine to a logic unit, distinct from the digital processing engine, for binarization if the syntax element is high use.

In another aspect of the disclosure, a method for a command and a syntax set is provided. The method reads a command and a syntax set. Further, the method sends the syntax set to one or more of a plurality of distinct logic units, based on the command, so that the syntax set is converted into a plurality of bits and a plurality of corresponding addresses for memory locations in an arithmetic encoder. In addition, the method receives the plurality of bits and the plurality of corresponding addresses from the one or more of the plurality of distinct logic units. Finally, the method multiplexes the plurality of bits and the plurality of corresponding addresses to form an output stream.

In yet another aspect of the disclosure, a method for a clock cycle implementation is provided. The method receives a syntax. Further, the method writes, at a fixed clock cycle after the receiving of the syntax, to a logic unit with the syntax so that a bit and a corresponding address are generated

BRIEF DESCRIPTION OF THE DRAWINGS

The present disclosure will become more apparent with reference to the following description taken in conjunction with the accompanying drawings wherein like reference numerals denote like elements and in which.

DETAILED DESCRIPTION

A method and apparatus are disclosed, which provide context address generation for motion vectors and coefficients. Accordingly, the method and apparatus leverage a hybrid architecture, which includes a sequential processor that works with dedicated hardware. The MPEG4 binarization process converts symbols to a serial binary sequence utilized by an arithmetic coder as an input. This binarization process involves an elaborate set of procedures which can be demanding on an external processor. This approach extracts only the high syntax categories for the hardware implementation. As a result, over ninety percent of all syntaxes within the MB will be addressed. Therefore, the hardware implementation may reduce the sequential processor loading by over ninety percent by utilizing less than one percent of the hardware resources of a typical MPEG4 encoder.

Figure 1:
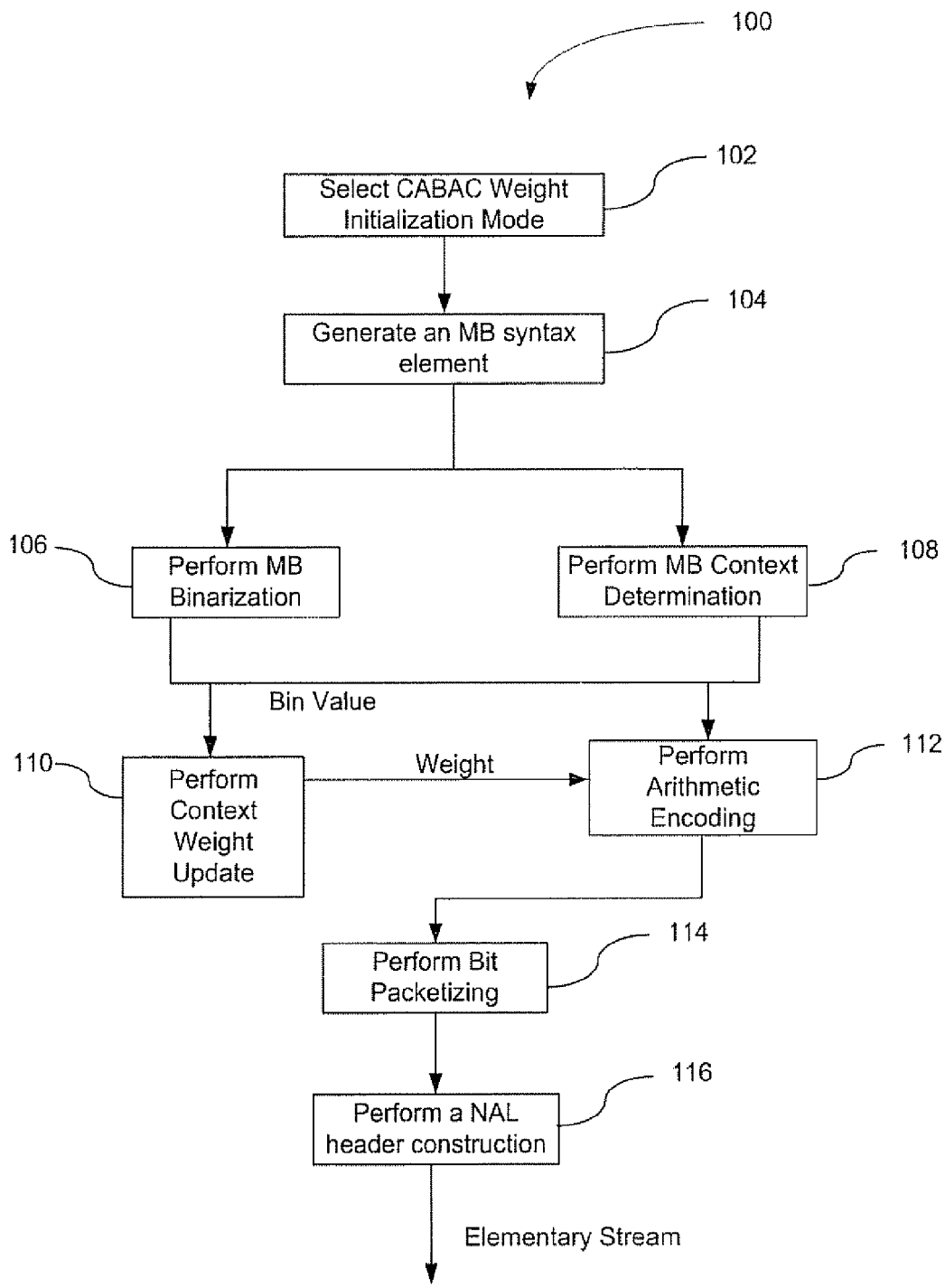
FIG. 1 illustrates a CABAC process.

FIG. 1 illustrates a CABAC process 100. At a process block 102, the CABAC process 100 selects a CABAC weight initialization mode. Further, at a process block 104, the CABAC process 100 generates an MB syntax sequence. In addition, at a process block 106, the CABAC process 106 converts a syntax to binary. The term binarization may be utilized to denote the process block 106. Further, at a process block 108, the CABAC process 100 performs a context address determination. The term ctxIdx generation may be utilized to denote the process block 108. At a process block 110, the CABAC process 100 performs a context weight update. Further, at a process block 112, the CABAC process 100 performs an arithmetic encoding. In addition, at a process block 114, the CABAC process 100 performs a bit packetizing. Finally, at a process block 116, the CABAC process 100 performs a NAL header construction. An elementary stream results from the CABAC process 100.

Figure 2:
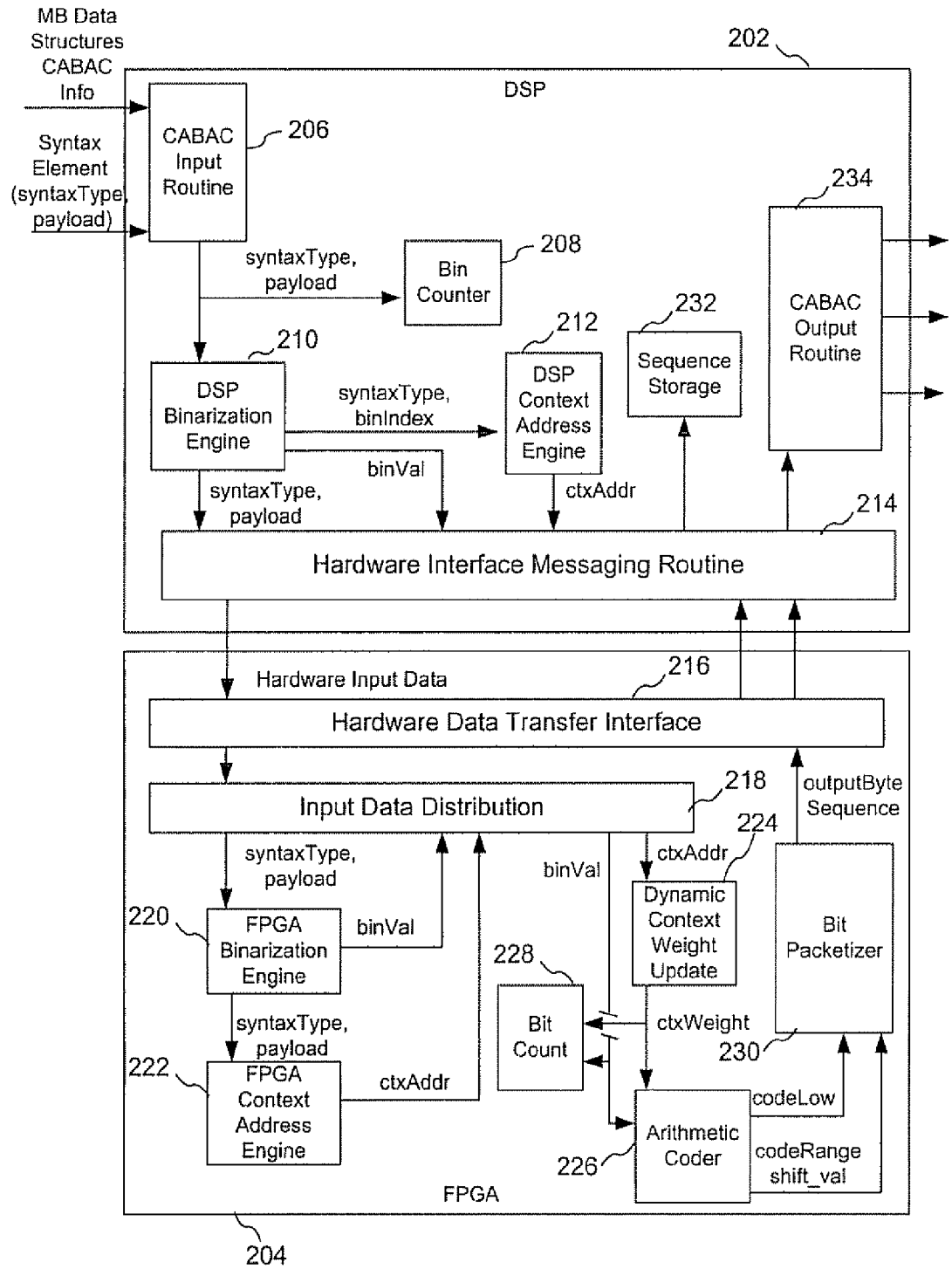
FIG. 2 illustrates a Digital Signal Processor hardware platform for an MPEG4 encoder.

FIG. 2 illustrates a Digital Signal Processor ("DSP") hardware platform 202 for an MPEG4 encoder. The DSP hardware platform 202 maintains the flexibility to support functions and features that may be developed in the present and/or the future. Further, the DSP hardware platform 202 may be manufactured at a relatively low cost. The DSP hardware platform 202 supports a high use/low use syntax processing framework that allows for high use syntax binarization and context address generation through a Field Programmable Gate Array ("FPGA") hardware accelerator 204. The DSP hardware platform 202 has a CABAC Input Routine module 206 that receives MB Data Structures CABAC Information and a syntax element, which comprises a syntaxType and a payload. The CABAC Input Routine module 206 provides the syntaxType and payload to a Binarization Counter 208. Further, the CABAC Input Routine module 206 also provides the MB Data Structures CABA Info, and the syntaxType and payload to a DSP Binarization Engine 210.

In order to simplify hardware needs, the DSP Binarization Engine 210 is utilized to determine syntax elements that meet a set of criteria. In one embodiment, the set of criteria is established to find high use syntax groups. For example the set of criteria may include, syntax in high demand during the binarization process, syntax that holds a high binarization to syntax ratio, syntax that is efficiently implemented on hardware, and syntax that utilizes a reasonable input parameter input set to binarize. Accordingly, the DSP Binarization Engine 210 performs low use syntax binarization generation and high use binarization routing.

With respect to the low use syntax binarization generation, the DSP Binarization Engine 210 determines if the set of criteria for high use syntax is met. If the criteria are not met, the DSP Binarization Engine 210 categorizes the syntax as low use syntax and sends the syntaxType and a binIndex to a DSP Context Address Engine 212. Further, the Context Address Engine 212 performs low use syntax address generation. Further, the DSP Binarization Engine 210 sends a binarization value as a pre-binarized data input to the Hardware Messaging Interface Routine 214. Accordingly, the Context Address Engine 212 outputs a context address ("ctxAddr") and sends the ctxAddr to a Hardware Messaging Interface Routine 214 as a pre-binarized data input.

With respect to the high use syntax routing, the DSP Binarization Engine 210 sends syntax that meets the set of criteria for high use syntax to the Hardware Messaging Interface Routine 214. Accordingly, the DSP Binarization Engine 210 sends the syntaxType and payload as an elementary input to the Hardware Messaging Interface Routine 214.

The Hardware Messaging Interface Routine 214 sends the data received from the DSP Binarization Engine 210 and/or the DSP Context Address Engine 212 from the DSP Platform 202 to Hardware Data Transfer Interface 216 of the FPGA hardware accelerator 204. In one embodiment, the Hardware Messaging Interface Routine 214 prepares the data according to the format utilized by the FPGA hardware accelerator 204 prior to sending the data. The Hardware Data Transfer Interface 216 then transfers the data to an Input Data Distribution module 218. Further, the Input Data Distribution module 218 sends the syntaxType and payload to an FPGA Binarization Engine 220. Accordingly, the FPGA Binarization Engine 220 performs a binarization and sends a binarization value back to the Input Data Distribution module 218. In addition, the FPGA Binarization Engine 220 sends the syntaxType and payload to an FPGA Context Address Generation Engine 222. Accordingly, the FPGA Context Address Engine 222 generates a ctxAddr and sends the ctxAddr to the Input Data Distribution module 218.

The Input Data Distribution module provides the binarization value to an arithmetic coder 226. The Input Data Distribution module also provides the binarization value to a bit count module 228. Further, the Input Data Distribution module provides the ctxAddr to a Dynamic Context Weight Update module 224. The Dynamic Context Weight Update module 224 generates a context weight ("ctxWeight"). Accordingly, the Dynamic Weight Update module 224 provides the ctxWeight to the Arithmetic Coder 226. The Dynamic Weight Update module 224 also provides the ctxWeight to the bit count module 222

The Arithmetic Coder 226 generates a codeLow and a codeRange shift_val. Further, the Arithmetic Coder 226 sends the codeLow and the codeRange shift_val to a bit packetizer 230. The bit packetizer 230 outputs an outputByte Sequence and sends the outputByte Sequence to the Hardware Data Transfer Interface 216, which then sends the outputByte Sequence to the Hardware Interface Messaging Routine module 214 in the DSP hardware platform 202. In addition, the Hardware Interface Messaging Routine module 214 stores the outputByte Sequence in a sequence storage 232. The Hardware Interface Messaging Routine module also sends the outputByte Sequence to a CABAC Output Routine 234 to be outputted from the DSP hardware platform 202.

The FPGA binarization engine 220 and the FPGA context address engine 222 may significantly reduce the processing load by the DSP platform 202. Providing hardware assistance to the DSP binarization engine 210 and the context address engine 212 reduces the work load of the DSP platform 202, thereby enabling potentially more rate distortion analysis iterations.

As an example, MPEG4 supports a total of thirty one CABAC syntax element groups. From this set, sixteen syntax groups take on one bit, two syntax groups take on eight bits, and two syntax groups take on sixteen bits. The method and apparatus may focus on the high use syntax groups, which are the following one bit, eight bit, and sixteen bit syntax groups: significant_coeff_flag, last_significant_coeff_flag, coeff_abs_level_minus1, coeff_abs_level_minus1, mvd_X, and mvd_Y. Accordingly, the method and apparatus may have a syntax group that covers approximately ninety percent of the syntaxes generated when an MB is encoded. Accordingly, an external processor may binarize and generate the context address for the remaining syntax elements.

Figure 3A:
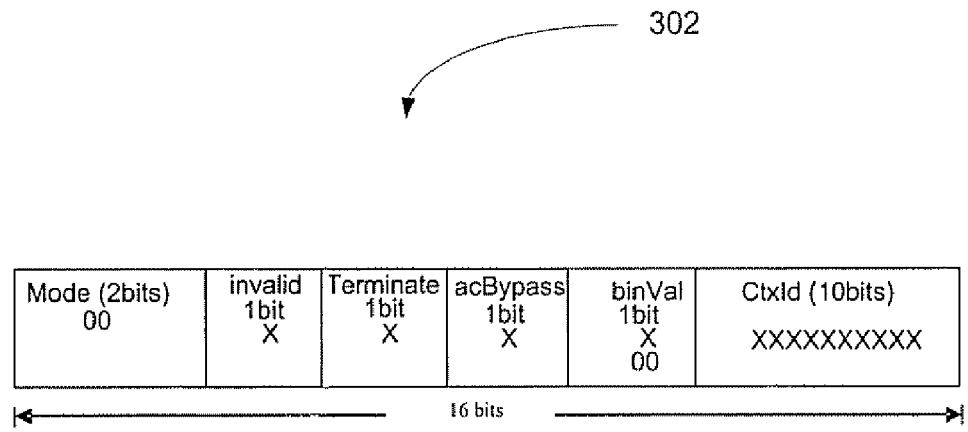
FIGS. 3A-3D illustrate the different data types that the input data distribution module may provide to the Field Programmable Gate Array binarization engine and the Field Programmable Gate Array context address engine.

FIGS. 3A-3D illustrate the different data types that the input data distribution module 218 may provide to the FPGA binarization engine 220 and the FPGA context address engine 222. FIG. 3A illustrates a prebinarized data format 302. Accordingly, the pre binarized data format 302 has a mode of 00B and is delivered with pre-binarized bins and associated context addresses.

Figure 3B:
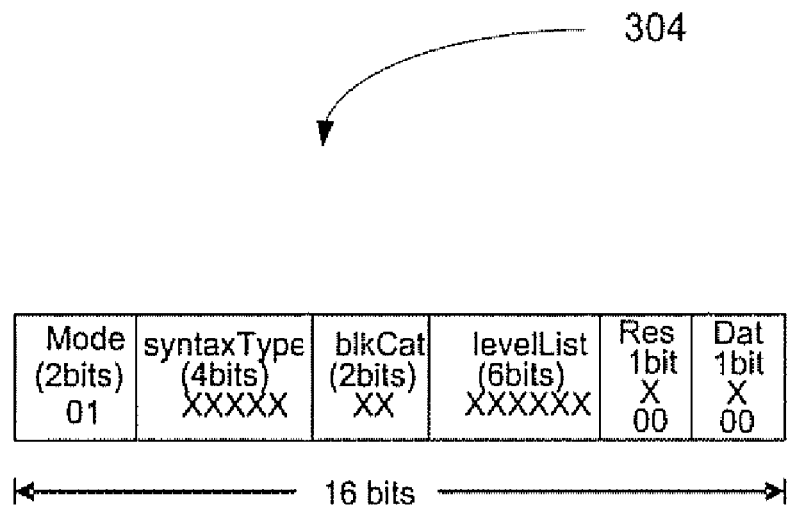

FIG. 3B illustrates a single flag syntax data format 304. Accordingly, the single flag syntax data format 304 has a mode of 01B and carries syntax elements with a one bit flag. The syntaxType field identifies the syntax group for the data in the payload. As an example, the following syntax groups may fill the syntaxType field: Bypass, mvd_x, mvd_y, significant_coeff_flag, last_significant_coeff_flag, coeff_abs_level_minus1, coeff_sign_flag, and coeff_abs_level. The Bypass is utilized to flush the syntax processing module pipeline. In addition, the blkCat field provides block type specific information. For instance, a value of zero indicates that the ctxBlkCat equals, zero, one, two, or four. Further, a value of one indicates that the ctxBlkCat equals three. In addition, a value of two indicates that the ctxBlkCat equals five. The levelList field provides the coefficient flag index into the block.

Figure 3C:
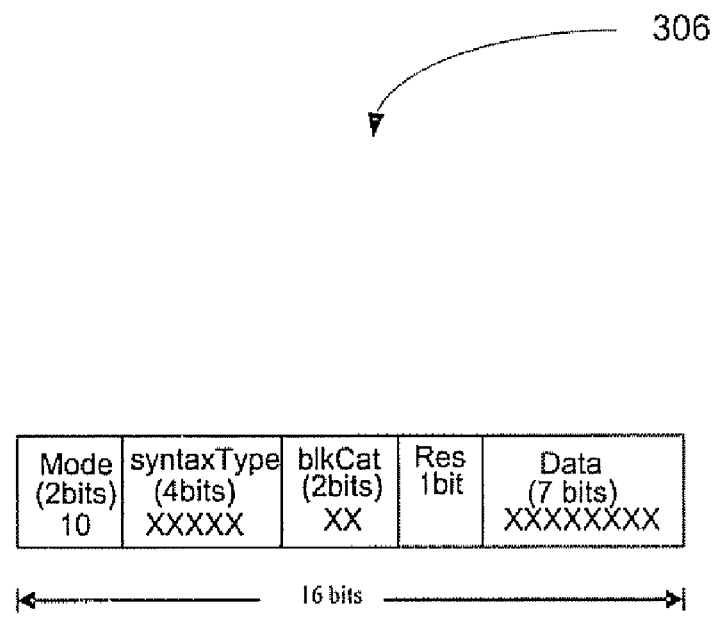

FIG. 3C illustrates a block syntax data format 306. Accordingly, the block syntax data format 306 carries an eight bit block coefficient syntax and the associated information to properly create the syntax ctxAddr. The data field holds the coeff_abs_level_minus1 value. Further, the Res field is a sign field that holds the associated sign value.

Figure 3D:
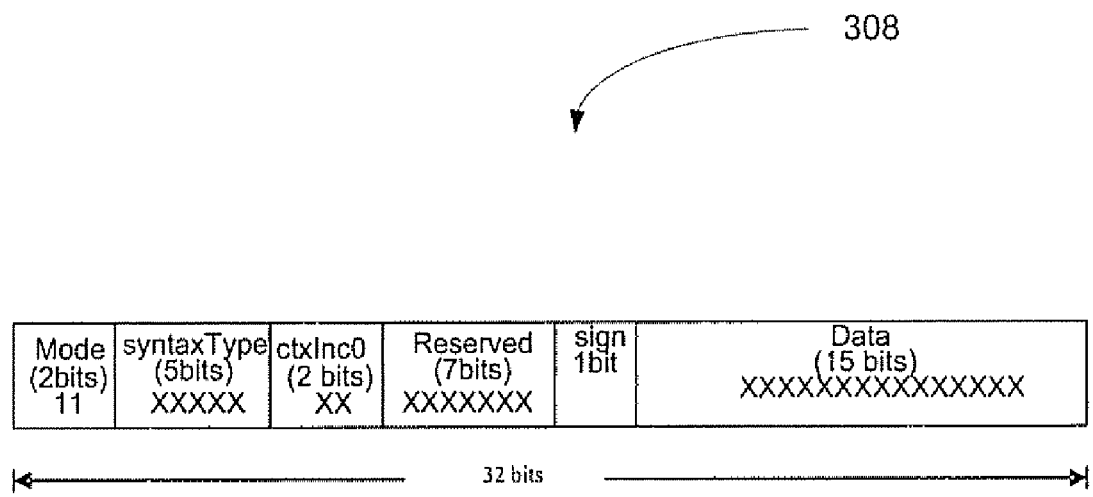

FIG. 3D illustrates a vector syntax data format 308. Accordingly, the vector syntax data format 308 carries the sixteen block coefficient syntax and the associate information to properly crate the syntax ctxAddr. The ctxInc0 field provides the bin index increment for the first bit from the binarization process. This parameter is derived from accessing the neighboring motion vector values. Further, the value is computed once per MB. The value is independent with respect to the current MB mode.

Figure 4:
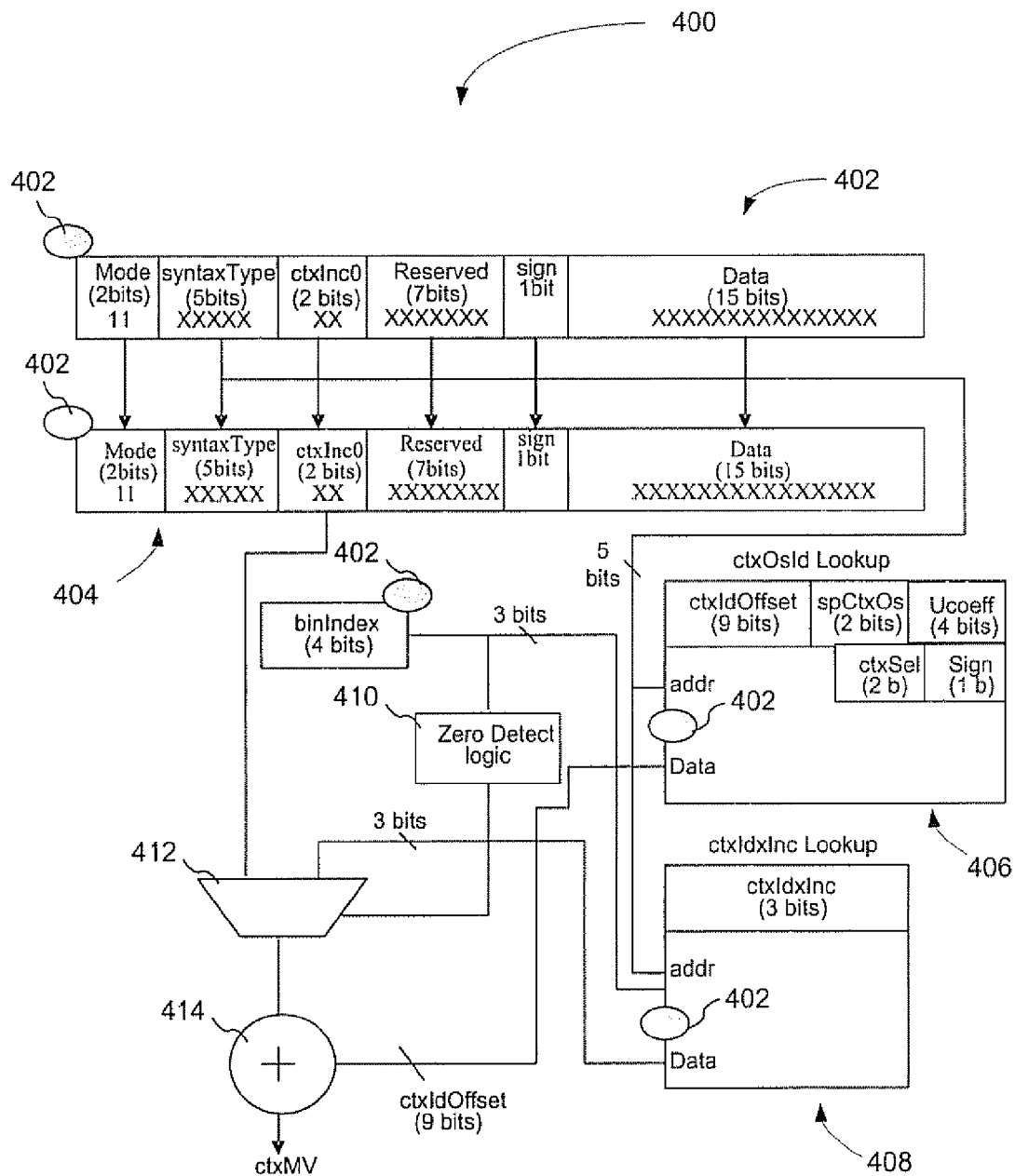
FIG. 4 illustrates a block diagram with logic that may be utilized to generate the context index address for the motion vectors of the vector syntax data format shown in FIG. 3D.

FIG. 4 illustrates a block diagram 400 with logic that may be utilized to generate the context index address ("ctxId") for the motion vectors of the vector syntax data format 308 shown in FIG. 3D. Each of the circles in FIG. 4 and the other figures in the disclosure represent a latch point. Further, each of the numbers indicated at different logic components within the figures of the disclosure represent a data dependency. For illustrative purposes, a first motion vector 402 and a second motion vector 404 are illustrated, each being in the vector syntax data format 308. A variety of latch points 402 may be utilized to generate the ctxId. The ctxId for the motion vectors is constructed from a base offset address ctxIdOffset and an incremental offset stxIdxInc. A ctxIdOffset lookup table 406 may be utilized to look up the offsets for the syntax types. Further, a ctxIdxInc table 408 may be utilized by both the motion vectors, i.e., the first motion vector 402 and the second motion vector 404. The citxIdxInc for bin zero, which is detected through zero detect logic 410, utilizes neighboring MB type and motion vector information. The zero detect logic 410 controls the multiplexer 412 and the outcome of an adder 411. Therefore, the offset ctxInc0 is computed by the external processor and fed into the hardware through a field along with the payload.

The logic may be implemented in a module that supports a single clock pipe delay that works at a rate of one context address per clock cycle. Further, the module may take on a total of three Arithmetic Logic Modules ("ALMS") and one 4 KBITS memory of unshared resources within the FPGA hardware accelerator 204.

Figure 5:
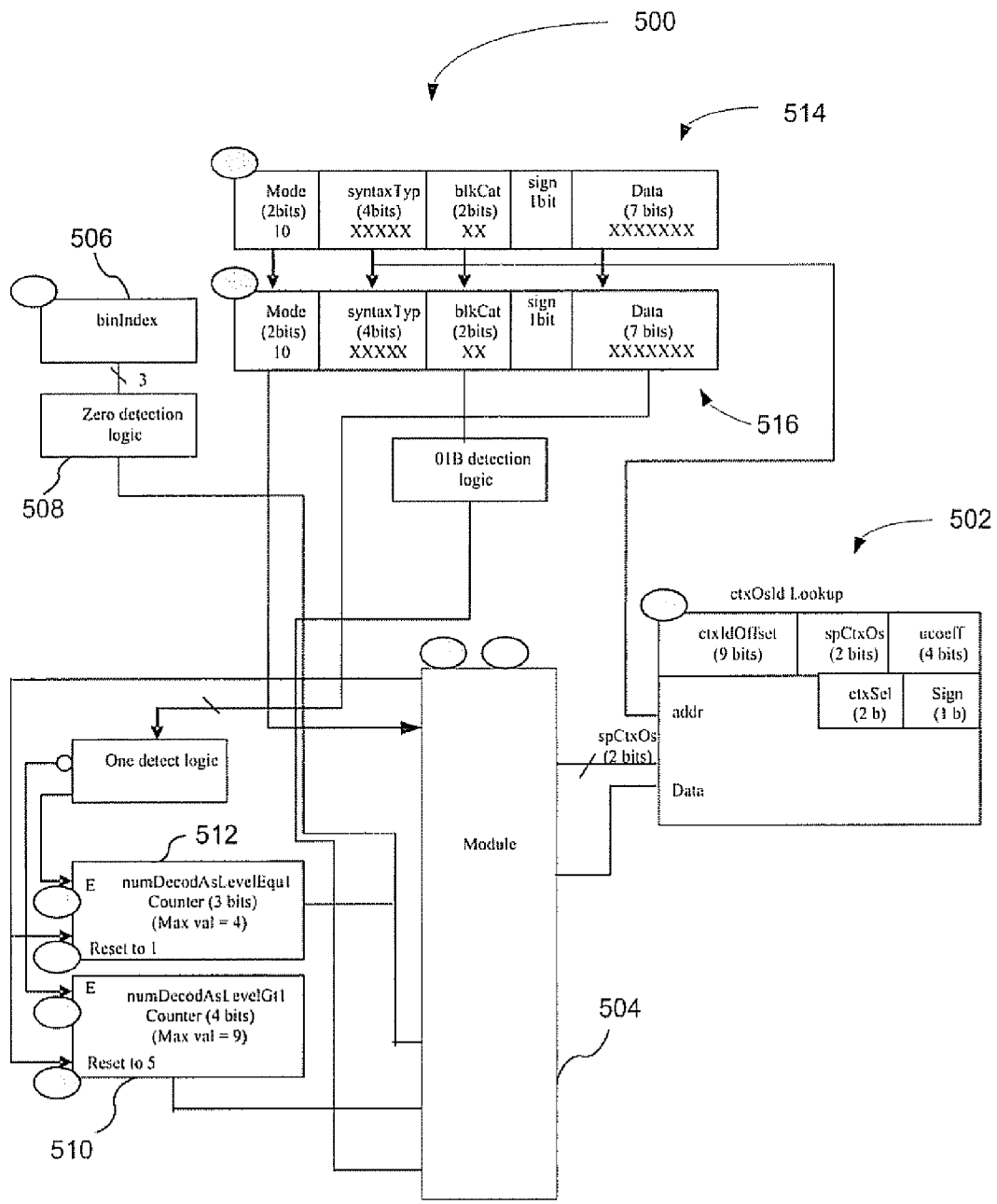
FIG. 5 illustrates a block diagram that has hardware logic, which may be utilized to generate the context index address for the coefficient absolute level minus 1 values, e.g., the block syntax data format as illustrated in FIG. 3C.

FIG. 5 illustrates a block diagram 500 that has hardware logic, which may be utilized to generate the ctxId for the coefficient absolute level minus 1 values, e.g. the block syntax data format 306 as illustrated in FIG. 3C.

The hardware logic calculates the ctxAddr for the coefficient absolute level syntax elements in one cycle. This calculation may be performed in two parallel modules, i.e., a first module 502, and a second module 504. The first module 502 looks up the base context offset address. The syntaxType field encodes not only the syntax group, but also the ctxBlkCat information. The second module 504 computes the incremental offset based on both the bin index number 506, which equals zero or greater than zero as determined by zero detection logic 508, and the previous coefficient levels, which equal one or greater than one as determined by a first numDecode counter 510. In one embodiment, incremental offsets range from zero to four for the bin index equaling zero, and five to nine for a bin index greater than zero.

The hardware logic in the block diagram 500 may support a one clock delay pipeline, represented by two back to back latches, i.e., a first back latch 514 and a second back latch 516, at a rate of one syntax address per clock. In one embodiment, the first numDecode counter 510 and a second numDecode counter 512 may not utilize an additional pipeline since the counters hold the status of the current block coefficients up to but not including the current block coefficients. Accordingly, the first numDecode counter 510 and the second numDecode counter 512 may utilize forty eight dedicated ALMs from the FPGA resource pool.

Figure 6:
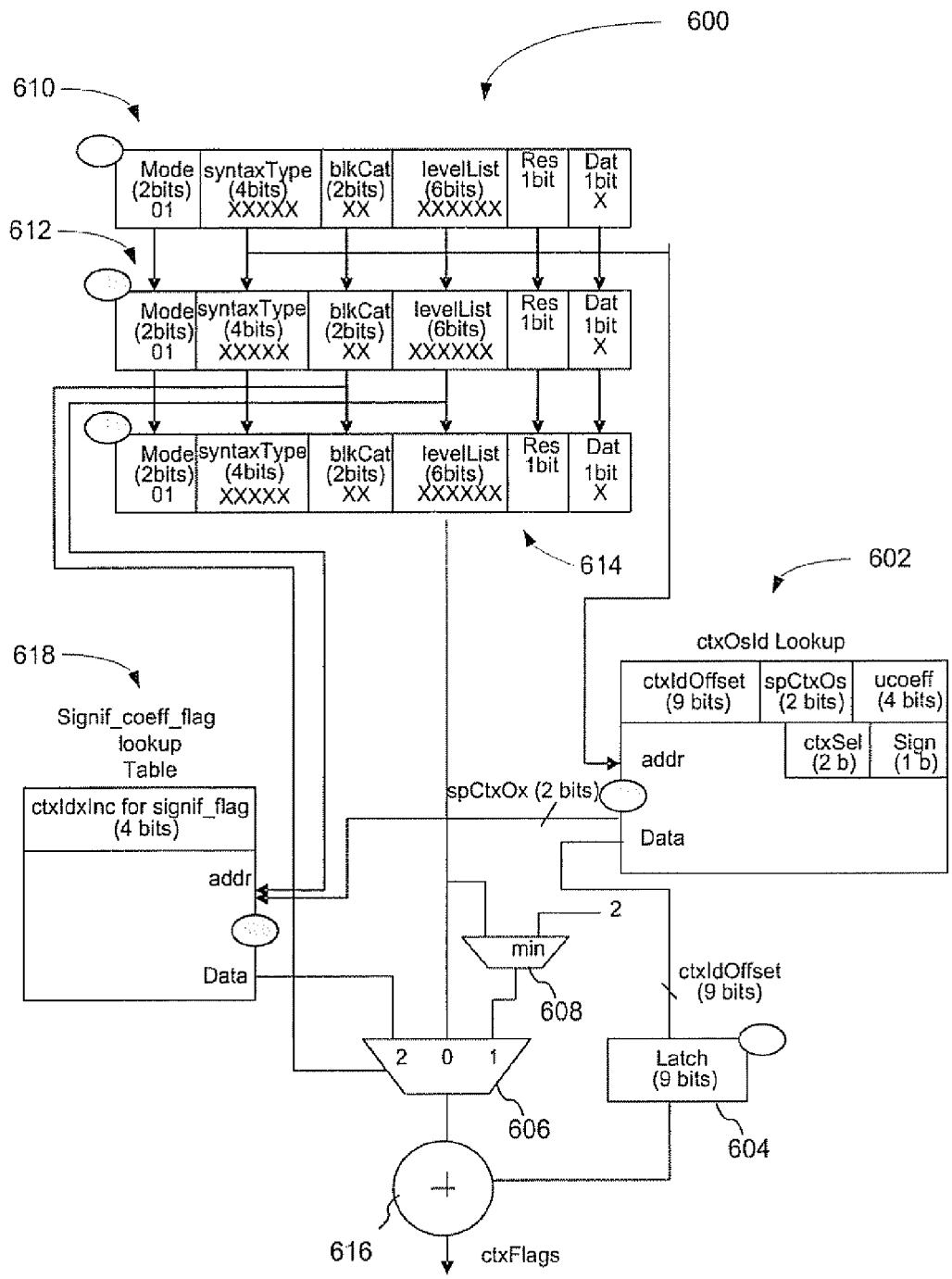
FIG. 6 illustrates a block diagram having logic for generating the context index address for coefficient significance flags for the single flag syntax data format as shown in FIG. 3B.

FIG. 6 illustrates a block diagram 600 having logic for generating the ctxId for coefficient significance flags for the single flag syntax data format 304 as shown in FIG. 3B and 600 as shown in FIG. 6. Accordingly, the logic may be implemented in a module having ctxOsid Lookup table 602 to generate the ctxAddrs for the significance flags which are latched in a latch 604 and the sign flag in the ctxOsid Lookup table 602. In one embodiment, the value zero equals sig_coeff_flag (frame), the value one equals last_sig_coeff_flag, the value two equals coeff_abs_level_minus1 as encoded by the logic between a first switch 606 and a second switch 608. A memory block 618 may be utilized as a lookup table to generate the ctxIdxInc output for the first switch 606. Further, the three significance flag types are identified through the blkCat field. The sign flag ctxAddr is supported through a levelList pass through mode with the levelList set to zero. An adder 616 carries out the final ctxAddr adjustment by adding the offset from the second switch 608 to the ctxOsid Lookup table 602. The module may utilize sixteen ALMs and one 4 KBITS memory. The implementation utilizes a two pipeline delay supported by three back to back latches, e.g., a first latch 610, a second latch 612 following the first latch 610, and a third latch 614 following the second latch 612.

Figure 7:
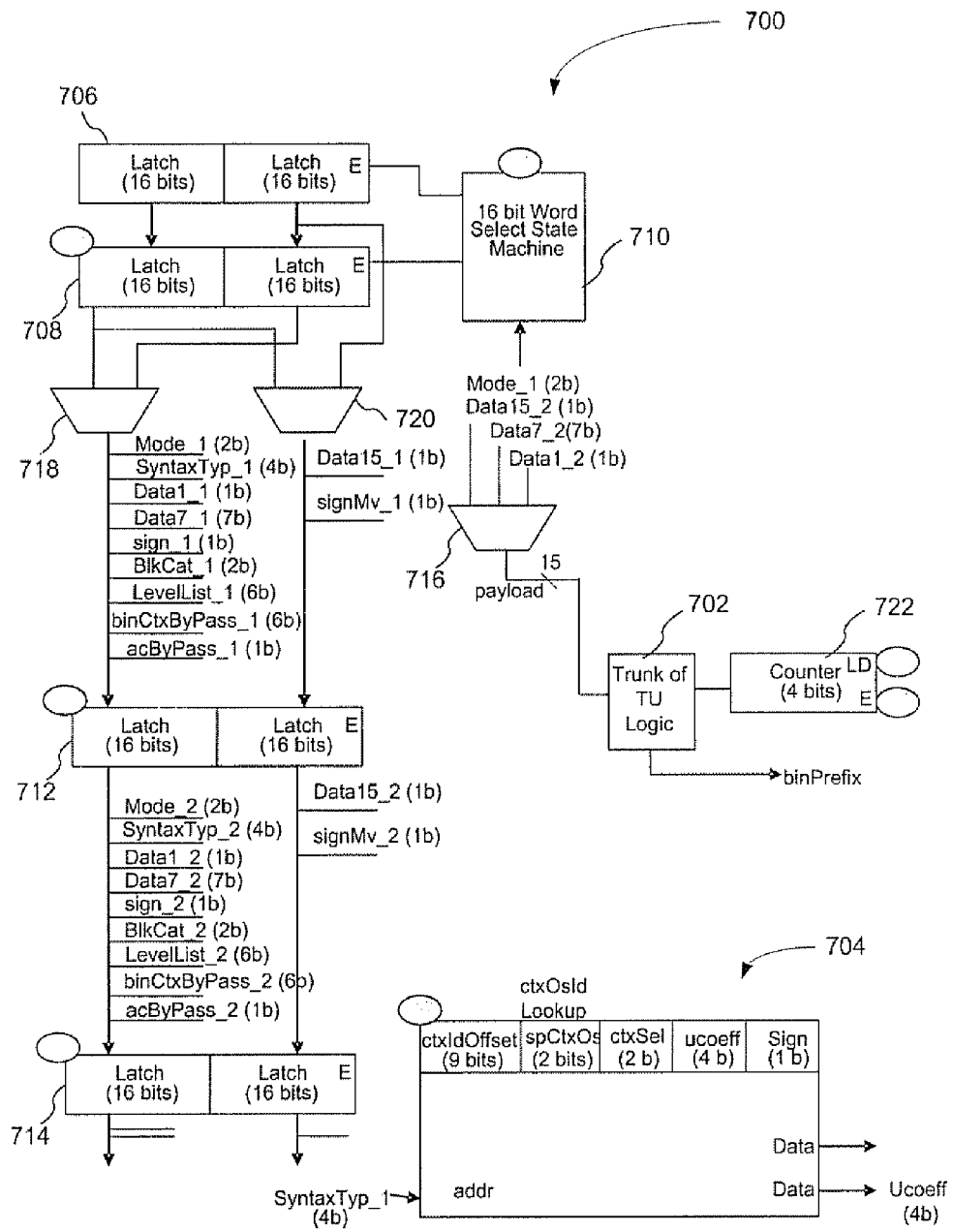
FIG. 7 illustrates a block diagram of a UEG binarization engine.

FIG. 7 illustrates a block diagram of a Unary/kth Order Exp-Golomb ("UEG") binarization engine 700. The UEG binarization engine 700 receives and converts syntax elements into a sequential series of bits in a format that is compatible with the context weight update arithmetic coder 226, as illustrated in FIG. 2. The prefix implementation includes support for both a fixed length ("FL") function and a truncated unary ("TU") binarization function implemented in trunk of TU logic 702. The UEG suffix encoding implementation 704 is utilized by the UEG process.

The UEG binarization engine 700 clocks in thirty two bit data into two stages of holding registers, i.e., a first holding register 706 and a second holding register 708. A word select state machine 710 aligns the data based on a two bit mode field to address the two different input data lengths: sixteen bits and thirty two bits, using two multiplexors, e.g., a first multiplexor for the upper sixteen bits 718 and a second multiplexor for the lower sixteen bits 720. Further, the UEG binarization engine 700 processes the mode field and then re-routes words over a single cycle using a multiplexor 716. The word select state machine 710 may also effectively throttle the input data rate by controlling the latch enable for the two thirty two bit holding registers, i.e., the first holding register 706 and the second holding register 708. Two additional pipeline registers, i.e., a first pipeline register 712 and a second pipeline register 714 following the two holding registers are utilized to achieve appropriate pipeline latency for carrying out the binarization process. In one embodiment, a front end first in first out ("FIFO") memory is utilized to shield Direct Memory Access ("DMA") bursts from the UEG binarization engine 700.

The binarization implementation may support three binarization methods. FL binarization process, TU binarization process, and concatenated unary/K-th order Exp-Golomb (UEGk) binarization with a suffix bypass in the UEG suffix encoding implementation 704. The UEG binarization engine 700 determines the binarization type by parsing both the mode and the syntax type field. The UEG binarization engine 700 parses the syntaxType field with the support of the ctxOsid lookup table in the UEG suffix encoding implementation 704, which generates not only the binarization configuration parameters, but also other parameters for context address generation.

With respect to the FL binarization process, the mode field data controls a multiplexer 716, which pulls the payload from the input data following the input data format. This payload is then loaded directly into a binSuffix output shift register. This output shift register then shifts out the binVal starting with the most significant bit with a length of UCoeff.

Further, with respect to the trunk-of-TU logic 702, the payload from the input data is loaded into a decrementing counter 722. The binVal holds a value equaling one when the counter remains greater than zero. The trunk-of-TU logic 702 inserts a trailing zero or one based on the payload value. The TU process generates UCoeff number of output bits.

With respect to the Concatenated unary/K-th order Exp-Golomb ("UEGk") binarization process, the payload is compared to UCoeff value. The second pipeline register 714 receives the minimum of the two values. The UEG binarization engine 700 then proceeds to generate bin values following the FL binarization process. When the payload is greater than uCoeff, the difference, which is the UEG suffix, is then passed into a UEG suffix module 800, as shown in FIG. 8.

Figure 8:
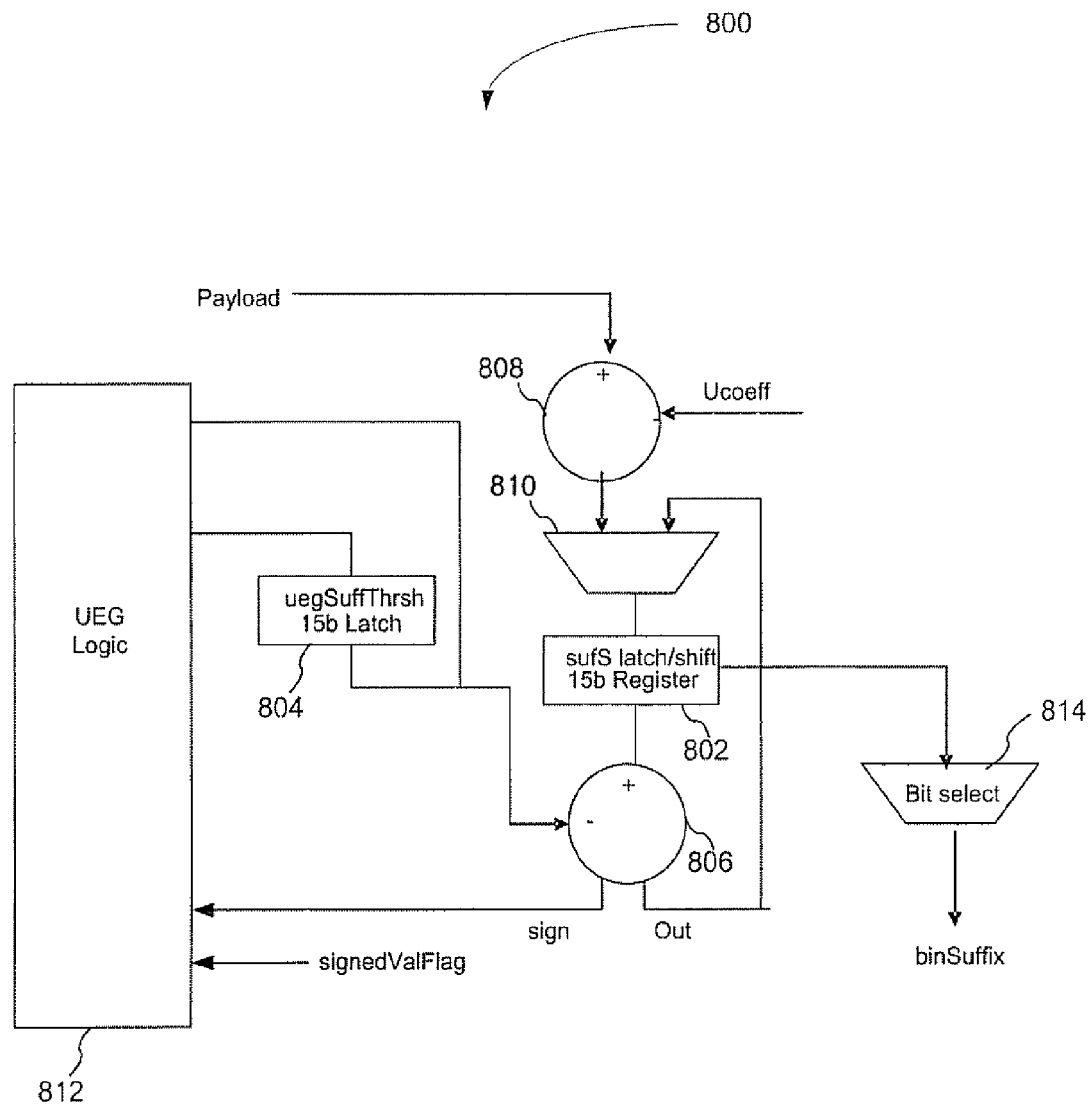
FIG. 8 illustrates a block diagram for a UEG suffix module.

FIG. 8 illustrates a block diagram for the UEG suffix module 800. The UEG suffix module 800 initializes the sufS register 802 with the difference between the payload and uCoeff computed by an adder 808 and a multiplexor 810. The sufS latch/shift register 802 is then reduced in value by an exponentially increasing threshold value uegSuffThrsh, which is updated and stored in the uegSuffThrsh latch 804. This process terminates when the uegSuffThrsh exceeds sufS, which is detected through the sign bit from a subtractor 806. The remainder is then shifted out serially through the sufS latch/shift register 802 and a bit selector 814 that selects a subset of the bits stored in the sufS latch/shift register 802. The UEG suffix bin is arithmetically encoded in bypass mode. The UEG module supports several modes which are configured through UEG logic 812.

Figure 9:
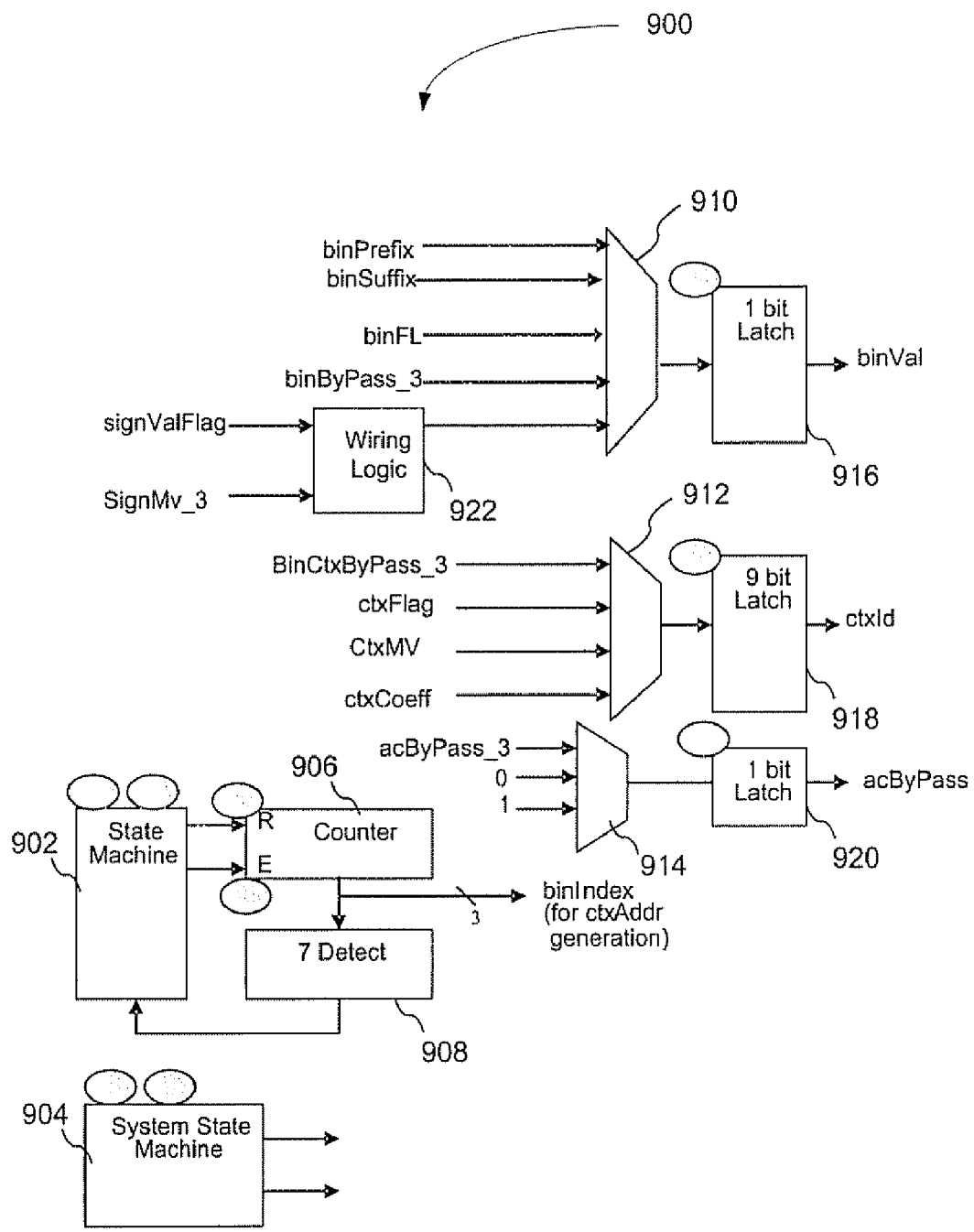
FIG. 9 illustrates two different state machines that may be utilized in the UEG binarization engine.

FIG. 9 illustrates two different state machines that may be utilized in the UEG binarization engine 800, as shown in FIG. 8. The binarization engine may include two different state machine clocks controlled by a first state machine 902 and a second state machine 904. A first clock loads and decodes the new syntax by decoding the input data format from the UEG binarization engine 700, A second clock cranks the binary bin generator, which includes a counter 906 and a detector 908 to create the bins and associated context addresses, as illustrated in FIGS. 5-8. The first clock may clock at a slower rate than the second clock. The ratio is governed by the syntax type. In one embodiment, a front end FIFO may be utilized to hold the syntax elements given that the first clock may frequently suspend its cycles due to back end process loading. A first switch 910 selects the binary value, a second switch 912 selects the ctxaddress, and the third switch 914 selects the bypass mode to be latched by a corresponding latch. For instance, the binary value is latched by a first latch 916, the ctxaddress is latched by a second latch 918, and the bypass mode is latched by a third latch 920. Further, wiring logic 922 is utilized to select between two sign flags: signValFlag and SignMv_3. Assuming a DSP implementation with blind data dump over only a single mode calculation phase, the worst case data size is estimated to be one hundred sixty syntax elements per MB mode (at one syntax element per final output bit). The front end FIFO may have minimum of one hundred sixty times sixteen bits, which translates to a single 4 KBITS memory block.

In one embodiment, the implementation utilizes a minimum of one M512 memory block, one 4 KBITS memory block, and two hundred twenty ALMs. With respect to the FPGA hardware accelerator 204, the motion vector context address generator may utilize three dedicated ALMS and one 4 KBITS memory. Further, the coefficient context address generator may utilize forty eight dedicated ALMS. In addition, the coefficient and sign flag context address generator may utilize sixteen dedicated ALMS and one 4 KBITS memory. The binarization and integration engines may utilize two hundred twenty ALMs, one M512 memory, and one 4 KBITS memory. Further, the dynamic context weight update and arithmetic coder may utilize one hundred fifty nine ALMS (one hundred seventy eight actual), two 4 KBITS blocks (four 4 KBITS actual), and two M512 blocks. The multi-mode context management module leveraging internal memory blocks may utilize fifty three ALMS and eight 4 KBITS memory blocks. In one embodiment, the total hardware resources may utilizes four hundred ninety four ALMs, thirteen 4 KBITS memory blocks, and three M512 memory blocks.

Figure 10:
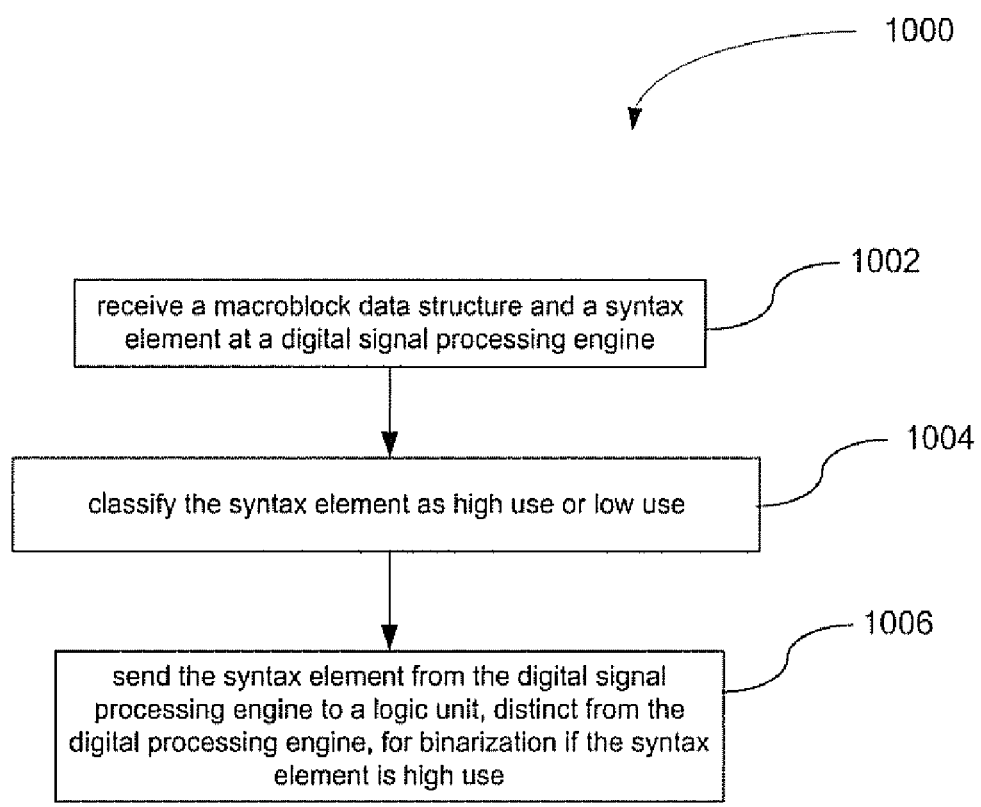
FIG. 10 illustrates a process for high/low usage.

FIG. 10 illustrates a process 1000 for high/low usage. At a process block 1002, the process 1000 receives a macroblock data structure and a syntax element at a digital signal processing engine. Further, at a process block 1004, the process 1000 classifies the syntax element as high use or low use. In addition, at a process block 1006, the process 1000 sends the syntax element from the digital signal processing engine to a logic unit, distinct from the digital processing engine, for binarization if the syntax element is high use.

Figure 11:
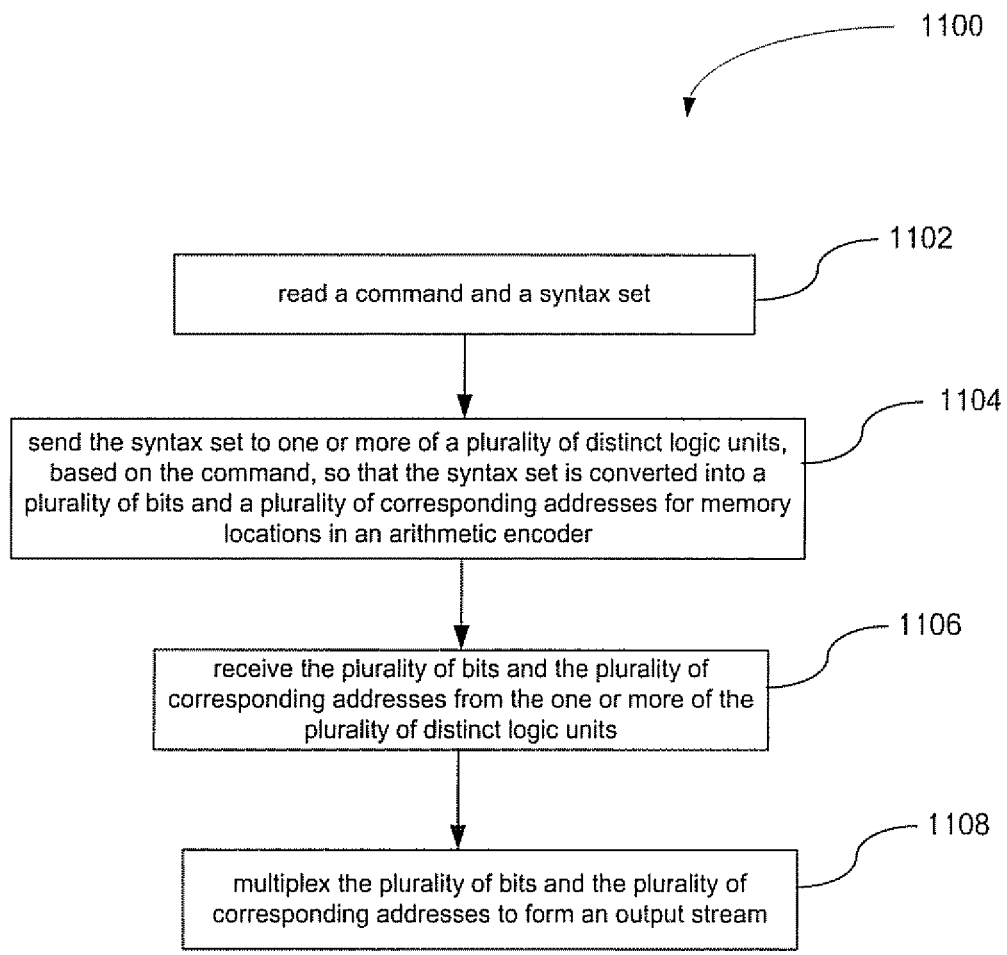
FIG. 11 illustrates a process for a command and a syntax set.

FIG. 11 illustrates a process 1100 for a command and a syntax set. At a process block 1102, the process 1100 reads a command and a syntax set. Further, at a process block 1104, the process 1100 sends the syntax set to one or more of a plurality of distinct logic units, based on the command, so that the syntax set is converted into a plurality of bits and a plurality of corresponding addresses for memory locations in an arithmetic encoder. In addition, at a process block 1106, the process 1100 receives the plurality of bits and the plurality of corresponding addresses from the one or more of the plurality of distinct logic units. Finally, at a process block 1108, the process 1100 multiplexes the plurality of bits and the plurality of corresponding addresses to form an output stream.

Figure 12:
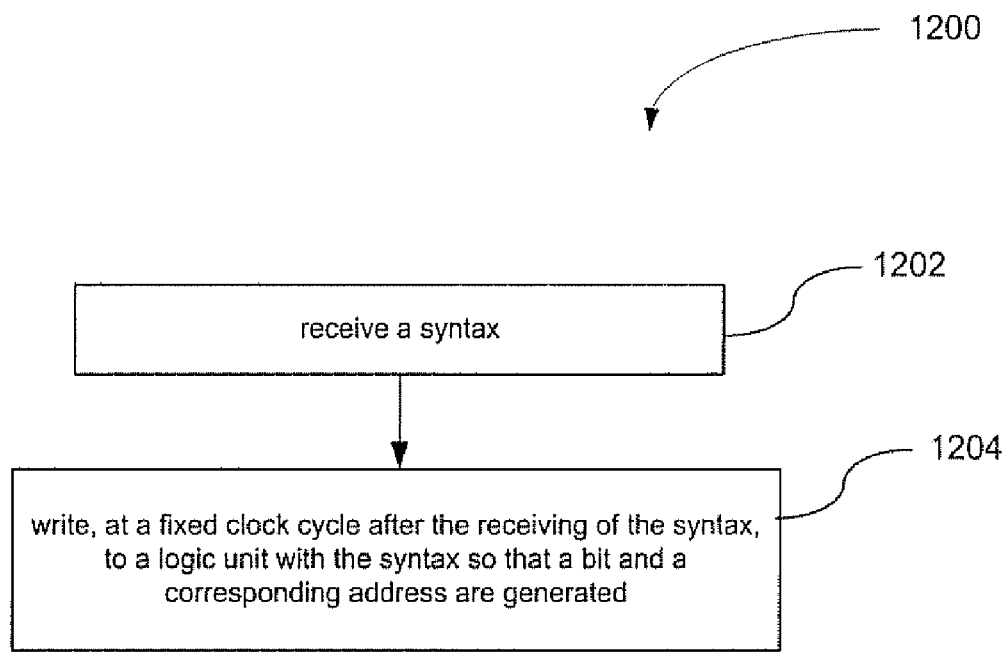
FIG. 12 illustrates a process for a clock cycle implementation.

FIG. 12 illustrates a process 1200 for a clock cycle implementation. At a process block 1202, the process 1200 receives a syntax. Further, at process block 1204, the process 1200 writes, at a fixed clock cycle after the receiving of the syntax, to a logic unit with the syntax so that a bit and a corresponding address are generated.

Figure 13:
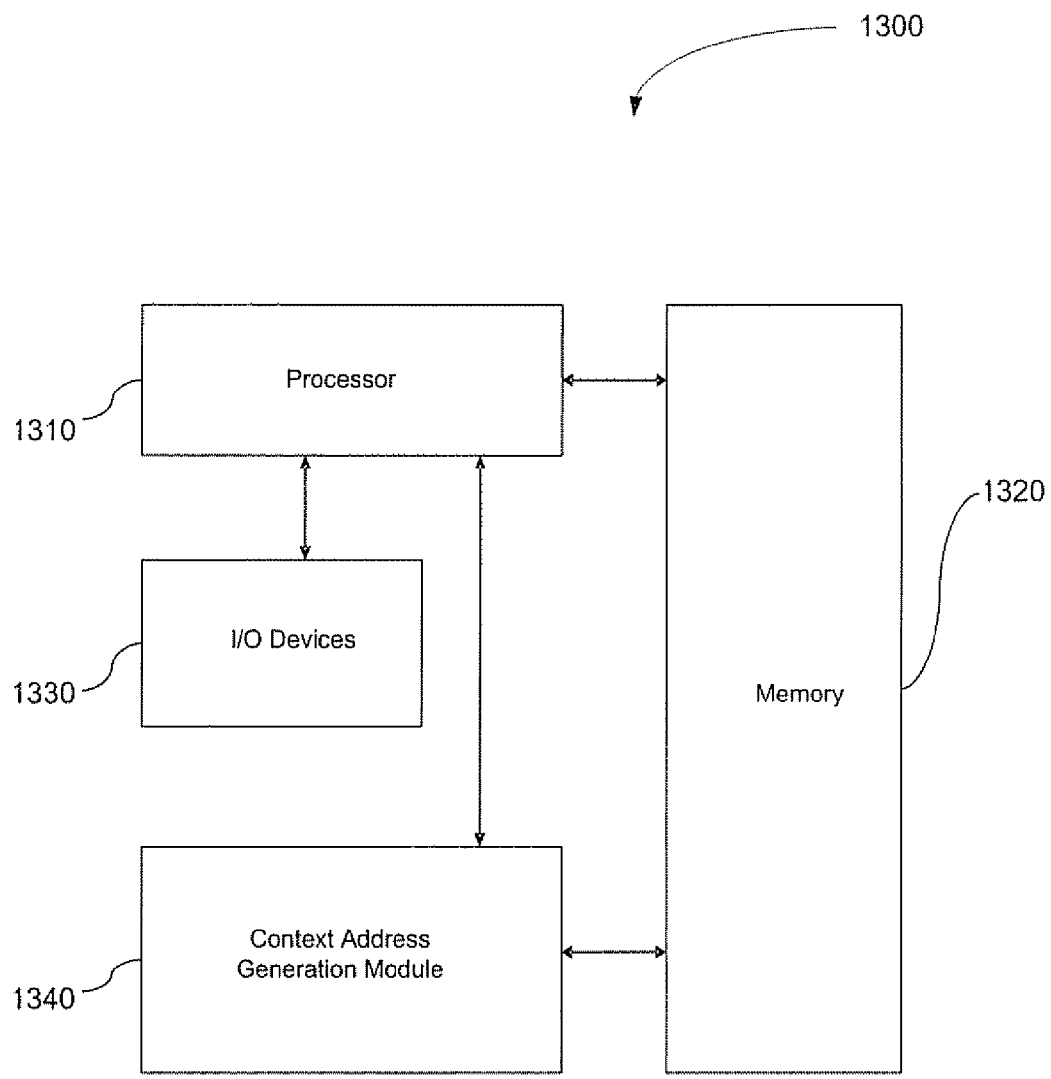
FIG. 13 illustrates a block diagram of a station or system that implements context address generation for motion vectors and coefficients

FIG. 13 illustrates a block diagram of a station or system 1300 that implements context address generation for motion vectors and coefficients. In one embodiment, the station or system 1300 is implemented using a general purpose computer or any other hardware equivalents. Thus, the station or system 1300 comprises a processor ("CPU") 1310, a memory 1320, e.g., random access memory ("RAM") and/or read only memory (ROM), a context address generation module 1340, and various input/output devices 1330, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the context address generation module 1340 may be implemented as one or more physical devices that are coupled to the CPU 1310 through a communication channel. Alternatively, the context address generation module 1340 may be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 1320 of the computer. As such, the context address generation module 1340 (including associated data structures) of the present disclosure may be stored on a computer readable medium, e.g., RAM memory, magnetic or optical drive or diskette and the like.

It is understood that the context address generation for motion vectors and coefficients described herein may also be applied in other type of encoders. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

I claim:

1. A method comprising:
   receiving a macroblock data structure and a syntax element at a digital signal processing engine;
   classifying the syntax element as high use or low use; and
   sending the syntax element from the digital signal processing engine to a logic unit, distinct from the digital processing engine, for binarization if the syntax element is high use.

2. The method of claim 1, wherein the logic unit is a field programmable gate array.

3. The method of claim 1, further comprising binarizing the syntax element at the digital signal processing engine if the syntax element is low use.

4. The method of claim 1, further comprising binarizing the syntax element into a plurality of binarizations at the digital signal processing engine if the syntax element is low use and generating a context address for the syntax element at the digital signal processing engine if the syntax element is low use.

5. The method of claim 4, further comprising arithmetically coding, at the logic unit, the plurality of binarizations based on the context address.

6. The method of claim 1, further comprising:
   binarizing the syntax element into a plurality of binarizations at the logic unit if the syntax element is high use; and
   generating a context address for the syntax element at the logic unit if the syntax element is high use.

7. The method of claim 6, further comprising arithmetically coding, at the logic unit, the plurality of binarizations based on the context address.

8. The method of claim 7, wherein the arithmetic coding is performed in an arithmetic coder that resides within a logic unit distinct from the digital signal processing engine.

9. A system comprising:
   a digital signal processing engine comprising a first binarization engine, the digital signal processing engine configured to receive a macroblock data structure and a syntax element; and
   a logic unit, distinct from the digital processing engine and communicatively coupled to the digital processing engine, the logic unit comprising a second binarization engine, a multiplexor, and an arithmetic encoder;
   wherein the digital signal processing engine is further configured to classify the syntax element as high use or low use, to perform the binarization in the first binarization engine if the syntax element is low use, and to send the syntax element to the logic unit for binarization if the syntax element is high use.

10. The system of claim 9, wherein the digital signal processing engine is further configured to binarize the syntax element into a plurality of binarizations at the first binarization engine if the syntax element is low use, to generate a context address for the syntax element if the syntax element is low use, and to send the context address with the syntax element to the logic unit if the syntax element is high use.

11. The system of claim 9, wherein the logic unit is further configured to binarize the syntax element received from the digital signal processing engine into a plurality of binarizations at the second binarization engine, and to generate a context address for the syntax element.

12. The system of claim 9,
the logic unit further comprising a plurality of second logic units;
wherein the logic unit is configured to send the syntax set to one or more of the plurality of second logic units to convert the syntax element into a plurality of bits and a plurality of corresponding addresses for memory locations in the arithmetic encoder; to receive the plurality of bits and the plurality of corresponding addresses from the one or more of the plurality of second logic units; and to multiplex the plurality of bits and the plurality of corresponding addresses to form an output stream.

13. The system of claim 9,
the logic unit further comprising a second logic unit for generating a bit and a corresponding address;
wherein the second binarization engine is further configured to receive a syntax of the syntax element, and to write, at a fixed clock cycle after the receiving of the syntax, to the second logic unit with the syntax so that the bit and the corresponding address are generated by the second logic unit.

* * * * *